United States Patent [19]
Hewitt et al.

[11] 3,937,622
[45] Feb. 10, 1976

[54] AIR PURIFIER SYSTEM

[75] Inventors: William J. Hewitt, Monroeville; Frank W. Shirey, Irwin; Mortimer D. Wilson, Turtle Creek, all of Pa.

[73] Assignee: Westinghouse Air Brake Company, Wilmerding, Pa.

[22] Filed: Sept. 17, 1973

[21] Appl. No.: 397,703

[52] U.S. Cl. ............... 55/163; 55/316; 55/DIG. 17
[51] Int. Cl. ............................................. B01d 53/04
[58] Field of Search ... 55/33, 62, 163, 316, DIG. 17

[56] References Cited
UNITED STATES PATENTS

| | | | |
|---|---|---|---|
| 3,080,693 | 3/1963 | Glass et al. | 55/163 |
| 3,147,095 | 9/1964 | Kanuch | 55/163 |
| 3,472,000 | 10/1969 | Glass et al. | 55/163 |
| 3,696,588 | 10/1972 | Dussourd et al. | 55/163 |

*Primary Examiner*—Charles N. Hart
*Assistant Examiner*—Richard W. Burks
*Attorney, Agent, or Firm*—R. W. McIntire, Jr.; W. F. Poore

[57] ABSTRACT

This invention relates to apparatus for periodically automatically purging the contaminants from a filter unit of a compressed air system to reactivate the filtering medium in the filter unit during the time that an air compressor for supplying air under pressure to the system is operating unloaded or is stopped. The cleansing and reactivating apparatus comprises a purge reservoir disposed on the downstream side of the filter unit and valve means under the control of a compressor governor to automatically effect the supply of fluid under pressure from the purge reservoir to a fluid pressure operated combined compressor unloading and backflow vent valve device to automatically respectively cause unloading of the compressor upon the stopping there of and backflow of substantially dry air from the purge reservoir through the filtering medium, such as a desiccant in the filter unit, and this valve device to atmosphere until the pressure in the purge reservoir, and therefore, the operating pressure for this valve device, is reduced to a chosen low value. The conduit through which fluid under pressure flows from the discharge of the compressor to the inlet of the filter unit is so connected to the backflow pathway from the purge reservoir to atmosphere that the pressure in this conduit is reduced simultaneously with that in the purge reservoir as the fluid under pressure in this reservoir is released to atmosphere by backflow through the desiccant in the filter unit.

16 Claims, 1 Drawing Figure

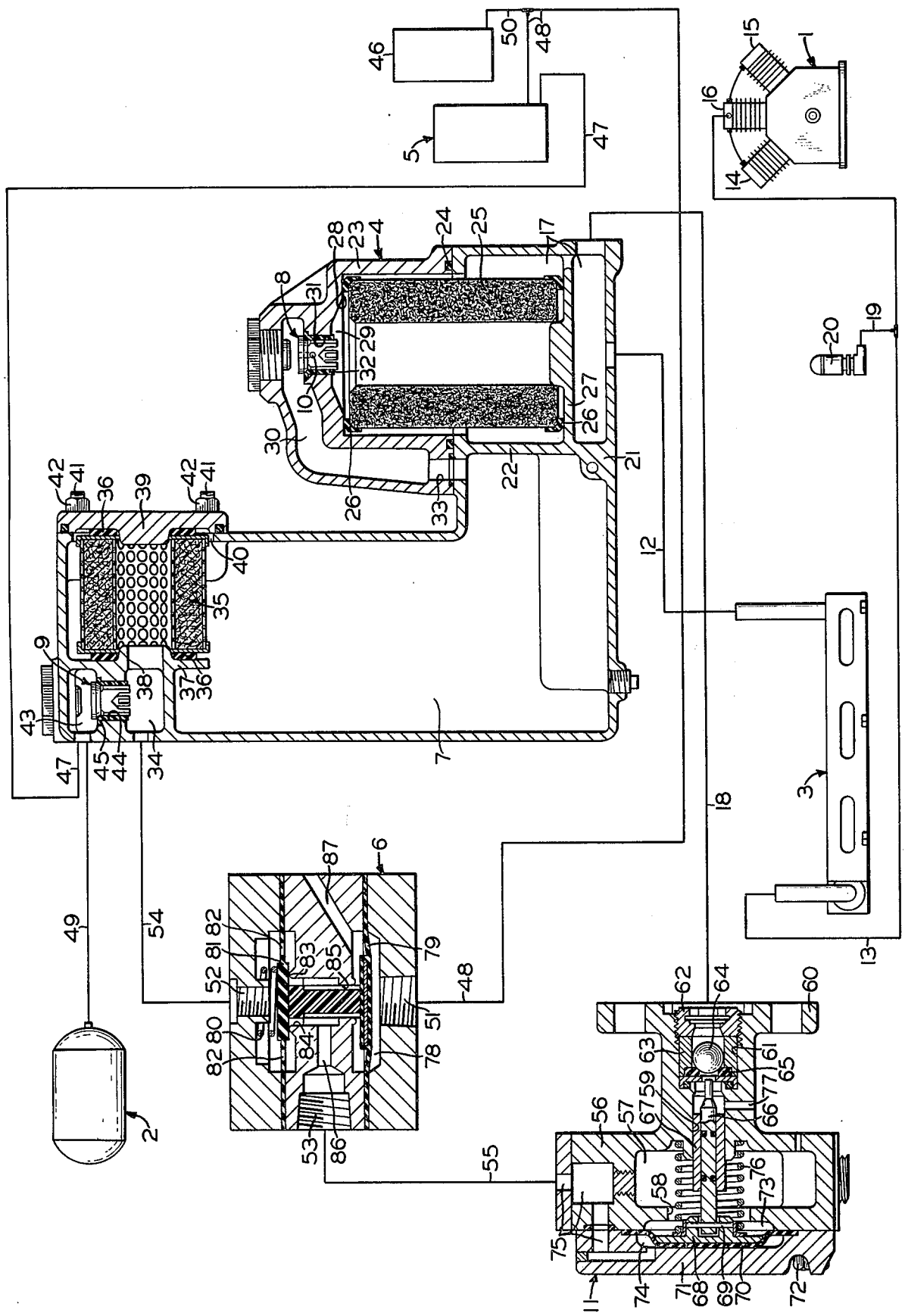

AIR PURIFIER SYSTEM

BACKGROUND OF THE INVENTION

In U.S. Pat. No. 3,080,693, issued Mar. 12, 1963 to William H. Glass et al, and assigned to the assignee of the present application, there is shown an automatic cleaning apparatus for a filter unit in a compressed air system that includes a purge reservoir, separated from a storage reservoir by a one-way flow valve device, from which purge reservoir substantially dry air flows back through a desiccant in the filter unit and a fluid pressure operated backflow vent valve device to atmosphere thereby reactivating the desiccant upon operation of this backflow vent valve device to its open or backflow venting position by fluid under pressure supplied thereto from the storage reservoir upon operation of a compressor governor to unload the compressor in response to the pressure in the storage reservoir reaching a first chosen value. In this filter unit reactivating apparatus the compressor governor maintains the communication between the storage reservoir and the backflow vent valve device open until the use of fluid under pressure from the storage reservoir reduces the pressure therein to a second chosen value, less than the above-mentioned first chosen value, whereupon operation of the governor, in response to this reduction of the pressure in the storage reservoir to this lower value, effects reloading of the compressor and the release of the operating fluid under pressure from the backflow vent valve device. Therefore, it is apparent that the backflow vent valve device remains in its open position for a period of time variable in accordance with the rate of use of fluid under pressure from the storage reservoir.

The substantially dry air under pressure, as it flows from the purge reservoir through the desiccant material in the filter unit picks up or entrains moisture from the desiccant, this moisture having been removed by the desiccant from the air previously supplied from the compressor to the storage reservoir as it flowed through the desiccant. It is well-known that as the pressure of a fluid is reduced, the temperature will be reduced a generally proportionate extent below the temperature of the ambient air surrounding the reservoir from which the fluid is flowing. Therefore, the temperature of the air from the purge reservoir having moisture entrained therein by reason of its backflow through the desiccant in the filter as it flows through the backflow vent valve device to atmosphere, will be reduced. This reduction of temperature of the flowing air will cause the entrained moisture to condense by flocculation into a flocculent mass that in winter weather would freeze. This icy mass would render the vent valve device inoperative thus preventing a subsequent reactivation of the desiccant in the filter unit. Moreover, with the vent valve device frozen in the open position, upon reloading of the compressor, some of the air compressed by the compressor, instead of flowing through the filter unit to the purge reservoir and thence to the storage reservoir, will flow past the open vent valve device to atmosphere. Of course such a loss of compressed air is undesirable.

Accordingly, it is the general purpose of the present invention to provide an automatic cleaning apparatus for a filter unit in a compressed air system that includes a purge reservoir, separated from a storage reservoir by a one-way flow valve device, from which purge reservoir fluid under pressure is supplied for effecting both reactivation of a desiccant in the filter unit and operation of a combined compressor unloading and backflow vent valve device through which air from the purge reservoir is released to atmosphere subsequent to passing through the filter unit. By this arrangement reclosure of the combined compressor unloading and backflow vent valve device is responsive to the comparative quick reduction of the pressure in the purge reservoir rather than to operation of the governor to effect restarting or reloading of the compressor, it being noted that this restarting or reloading operation of the governor is dependent upon the rate of use of the fluid under pressure in the storage reservoir which rate may vary considerably so that an appreciable amount of time could elapse before reclosure of the backflow valve device occurs thereby enabling the formation of ice therein in the manner explained above.

SUMMARY OF THE INVENTION

According to the present invention, an apparatus for periodically automatically purging the contaminants, such as water vapor, from a desiccant in a filter unit of a compressed air system to effect reactivation of the desiccant during the time that an air compressor for supplying air under pressure to the system is operating unloaded or stopped comprises a purge reservoir disposed on the downstream side of the filter unit and valve means under the control of a compressor governor to automatically simultaneously cause backflow of substantially dry air from the purge reservoir through the desiccant in the filter unit to atmosphere and a release of air under pressure in a conduit connecting the discharge valve chamber of the compressor to the inlet of the filter unit to thereby enable operation of the compressor when restarted against a minimum or no pressure in this conduit. The valve means includes a fluid pressure operated combined compressor unloading and backflow vent valve device operable in response to the supply of fluid under pressure thereto from the purge reservoir to cause backflow of substantially dry air from the purge reservoir through the desiccant in the filter unit and a vent valve embodied in this device to atmosphere to effect reactivation of the desiccant until the pressure in the purge reservoir is reduced to a chosen value dependent on the parameters of this valve device, and a fluid pressure operated supply valve device, operable in response to the supply of fluid under pressure thereto from a storage reservoir upon operation of a compressor governor when the pressure in the storage reservoir reaches a chosen maximum value, for effecting the supply of fluid under pressure from the purge reservoir to the backflow vent valve device to cause operation thereof.

In the accompanying drawing:

The single FIGURE is a diagrammatic view, partly in section, showing one embodiment of the above-described invention.

DESCRIPTION

Referring to the drawing, there is shown a compressed air installation such as is usually found on such as electric railway locomotives wherein the air compressor is directly driven by an electric motor that receives its current from such as a third rail. This installation comprises an air compressor 1 that is driven by an electric motor (not shown), an air pressure storage reservoir 2 for receiving and storing the air under pressure delivered by the compressor 1, an aircooled aftercooler 3 for cooling the compressed air as it flows from the compressor 1 to the storage reservoir 2, a filter unit 4 for removing oil vapor and water vapor from the compressed air flowing to the storage reservoir 2, and a governor device 5 for normally effecting the supply of air under pressure from the main reservoir 2 to a fluid pressure operated supply valve device 6 upon the pressure in the storage reservoir 2 attaining a chosen high pressure.

Also, according to the present invention, a cleansing and reactivating apparatus is further provided, which apparatus comprises a purge reservoir or volume 7 that, together with the filter unit 4, may be embodied in a single device, this volume 7 being interposed between the outlet of the filter unit 4 and the inlet to the storage reservoir 2, a pair of check valves 8 and 9 for respectively normally preventing backflow from the purge reservoir 7 to the filter unit 4 and from the storage reservoir 2 to the purge reservoir 7, a choke 10 in the form of two bores of small diameter provided in the check valve 8 and so arranged that their axes from a right angle, this choke 10 permitting flow of fluid under pressure between the purge reservoir 7 and the interior of the filter unit 4 at a controlled rate determined by the size of these bores, and a fluid pressure operated combined compressor unloading and backflow vent valve device 11 for controlling expulsion of air under pressure from the interior of the filter unit 4 and from both a pipe 12 that connects the outlet of the aftercooler 3 to the inlet of the filter unit 4 and a discharge pipe 13 that connects the inlet of the aftercooler 3 to the discharge valve chamber (not shown) of the compressor 1 as well as the interior of the aftercooler 3.

The compressor 1 shown has two low pressure cylinders 14 and 15 and a high pressure cylinder 16. The air compressed by the compressor 1 is conducted from a discharge valve chamber (not shown) of the high pressure cylinder 16 to an inlet chamber 17 of the filter unit 4 through the pipes 12 and 13 having therein the aftercooler 3. The inlet chamber 17 is connected to the vent valve device 11 by a pipe 18 to permit connecting the discharge chamber of the high pressure cylinder 16 of the compressor 1 to atmosphere to unload the compressor in a manner hereinafter described. A branch pipe 19 connects the pipe 13 to a safety valve device 20 which may be of any suitable construction to limit the maximum pressure delivered by the compressor 1 to the pressure setting of the safety valve device 20.

The filter unit 4 may be somewhat similar in construction and operation to the filter unit shown and described in U.S. Pat. No. 2,930,445, issued Mar. 29, 1960 to William H. Glass et al and assigned to the assignee of the present invention. This filter unit 4 comprises a housing generally designated 21 it being noted from the drawing that the hereinbefore-mentioned purge reservoir 7 and chamber 17 are formed in this housing 21 and separated from each other by a wall 22 that is cast integral with this housing. As shown in the drawing, the upper end of the chamber 17 is closed by a removable bell-shaped cover 23 that is secured to the housing 21 by any suitable means (not shown). The end of the cover 23 that abuts the housing 21 is provided with an annular recess in its surface into which a resilient sealing element 24 is disposed to afford a seal between the housing 21 and the cover 23.

Within the filter unit 4, as illustrated in the drawing, is a filter cartridge 25. It is to be understood that one or any number of cartridges may be used within the housing 21 and cover 23 and that each cartridge is substantially the same in construction and operation as the filter cartridges described in the above-mentioned U.S. Pat. No. 2,930,445. Therefore, a detailed description of the filter cartridge 25 is not deemed necessary.

An annular gasket or seal 26 is secured to each end wall of the filter cartridge 25 by any suitable oil and moisture resistant cement.

The lower gasket 26 of the cartridge 25 forms a seal with a support arm 27 that is formed integral with the wall 22 of housing 21 and extends into the chamber 17 and the upper gasket 26 forms a seal with an annular flat surface 28 formed on the cover 23.

The annular flat surface 28 surrounds the lower end of a truncated cone-shaped chamber 29 formed in the cover 23, it being noted from the drawing that the air under pressure, after flowing through the desiccant in the filter cartridge 25 to the hollow interior of this cartridge, flows into this chamber 29. This chamber 29 is connected to one end of a large passageway 30 formed in the cover 23 by a bore 31 into which is press-fitted a bushing 32 that at its upper end is provided with a valve seat for the hereinbefore-mentioned check valve 8 which provides a rapid rate of flow of air under pressure from the chamber 29 to the passageway 30 and a restricted rate of flow in the opposite direction via the choke 10 in this check valve 8. The other end of the large passageway 30 registers with one end of a bore 33 extending through the cover 23 and housing 21 and opening at its other end into the purge reservoir 7.

As shown in the drawing, the housing 21 is provided with a chamber 34 into which air under pressure may flow from the purge reservoir 7 via a filter element 35 of any suitable commercially available type that has an annular gasket or seal 36 secured to each end thereof. The seal 36 at the left-hand end of filter element 35 abuts and forms a seal with a wall or support arm 37 integral with the housing 21 and having a bore 38 extending therethrough to provide for the flow of air under pressure from the hollow interior of the filter element 35 to the chamber 34. The seal 36 at the right-hand end of the filter element 35 abuts and forms a seal with a cover member 39 that closes an opening 40 in the housing 21 and is removably secured to this housing by a pair of studs 41 and nuts 42.

Formed in the housing 21 is still another chamber 43 that is connected to the chamber 34 by a bore 44 into which is press-fitted a bushing 45 that at its upper end is provided with a valve seat for the hereinbefore-mentioned check valve 9 which provides for flow of air under pressure from the chamber 34 to the chamber 43 and prevents flow in the opposite direction.

The governor device 5 may be the same in construction and operation as the electric governor switch shown and described in U.S. Pat. No. 1,615,365, issued Jan. 25, 1927 to Clyde C. Farmer and assigned to the assignee of the present invention, except the switch portion of the electric governor switch shown in U.S. Pat. No. 1,615,365 is replaced by a compressor motor start-stop switch device denoted on the drawing by the numeral 46. The construction of the switch device 46 may be the same as that shown and described in U.S. Pat. No. 3,448,229, issued June 3, 1969 to Mortimer D. Wilson et al and assigned to the assignee of the present invention.

The governor device 5 has an inlet port to which is connected one end of a pipe 47 and an outlet port to which is connected one end of a pipe 48. The other end of the pipe 47 opens into the hereinbefore-mentioned chamber 43 into which also opens one end of a pipe 49 that at its opposite end opens into the storage reservoir 2. Consequently, it is apparent that the governor device 5 is constantly supplied with air at the pressure present in the storage reservoir 2. The other end of the pipe 48 is connected to a control port of the hereinbefore-mentioned supply valve device 6, and connected to this pipe 48 intermediate the ends thereof is one end of a pipe 50 the opposite end of which is connected to the switch device 46 the purpose of which is to control the starting and stopping of an electric motor (not shown) that drives the air compressor 1.

The construction and operation of the supply valve device 6 is the same as that of the fluid logic valve device 1 shown in FIG. 1 of U.S. Pat. No. 3,653,408, issued Apr. 4, 1972 to Ronald W. Coiner, and assigned to the assignee of the present invention. Therefore, a detailed description of the valve device 6 is not deemed necessary.

The supply valve device 6 is provided with a control port 51 to which the hereinbefore-mentioned other end of the pipe 48 is connected, a supply port 52 and a delivery port 53. Connected to the supply port 52 is one end of a pipe 54 the opposite end of which opens into the hereinbefore-mentioned chamber 34. Consequently, the supply port 52 is constantly supplied with air under pressure from the purge reservoir 7 via filter element 35, bore 38, chamber 34 and pipe 54. Connected to the delivery port 53 is one end of a pipe 55 the opposite end of which is connected to the hereinbefore-mentioned combined compressor unloading and backflow vent valve device 11 which will now be described in detail.

The valve device 11 comprises a valve body 56 having formed therein a chamber 57 into which opens two coaxial bores 58 and 59 that extend through two opposite walls of the chamber 57.

Formed integral with the right-hand end of the body 56 is an outwardly extending flange 60 that is provided with two smooth bores through which may extend a pair of cap screws for securing the valve device 11 to a suitable part of a vehicle such as a railway locomotive.

Coaxial with the bore 59 and extending through the flange 60 and into the body 56 is a counterbore 61 the right-hand end of which is provided with internal screw threads for receiving a hollow screw-threaded plug 62 that retains a valve seat member 63 in the counterbore 61 and is provided with internal screw threads for receiving one end of the hereinbefore-mentioned pipe 18.

Disposed within the valve seat member 63 is a ball-type valve 64 that may be unseated from a resilient valve seat 65 carried by the valve seat member 63 by a valve operating stem 66 that extends through a bushing 67 that is press-fitted into the bore 59, the chamber 57 and the bore 58, and is secured to a diaphragm follower 68 by means such as, for example, a pin 69.

The diaphragm follower 68 abuts the central portion of a diaphragm 70 the outer periphery of which is clamped between the left-hand end of the valve body 56 and a cover member 71 secured to the body 56 by such as, for example, a plurality of cap screws 72 a portion of one of which appears in the drawing.

The diaphragm 70 cooperates with the valve body 56 and the cover member 71 to form on the respective opposite sides of this diaphragm 70 a pair of chambers 73 and 74. The chamber 73 is connected to the chamber 57 by the bore 58 and opening into the chamber 74 is one end of a passageway 75 that extends through the cover member 71 and valve body 56 and at its other end has connected thereto the hereinbefore-mentioned opposite end of the pipe 55.

Interposed between the body 56 and the diaphragm follower 68 and extending through the bore 58 and chambers 73 and 57 in surrounding relation to the valve operating stem 66 is a spring 76 that, in the absence of fluid under pressure in the chamber 74, biases the left-hand side of the diaphragm 70 against the cover member 71 and the valve operating stem 66 to the position shown in the drawing. While the stem 66 occupies the position shown, its right-hand end is disposed out of contact with the ball-type valve 64. Therefore, so long as the stem 66 occupies the position shown, any fluid under pressure present in the pipe 18 will bias the valve 64 against its seat 65 thereby cutting off flow of fluid under pressure from the pipe 18 to atmosphere via the bore 59 and an exhaust passageway 77 provided in the body 56 that at one end opens at the wall surface of the bore 59 and at the other at the exterior surface of the body 56.

Operation

In operation, let it be assumed that the electric motor which drives the compressor 1 is stopped in which condition a pair of contacts (not shown) of the switch device 46 will occupy a closed position, it being understood that a main circuit breaker (not shown) is open to cut off the supply of electric power to the motor that drives the compressor 1, the storage reservoir 2 and the purge reservoir 7 are at atmospheric pressure, and the parts of the supply valve device 6 and the combined compressor unloading and backflow vent valve device 11 occupy the position in which they are respectively shown in the drawing.

Therefore, when the main circuit breaker is closed to effect the supply of power to the electric motor, it will start and operate the compressor 1 to deliver air under pressure through the pipe 13, aftercooler 3 and pipe 12 to the inlet chamber 17 of the filter unit 4. The compressed air thus supplied to the inlet chamber 17 will flow through the filter cartridge 25 to the chamber 29. In so doing, contaminants in the form of oil vapor and water vapor, in the compressed air will be condensed in the submicroscopic capillary fines consisting of the activated alumina which may constitute the desiccant with which the filter cartridge 25 may be filled. The moisture thus condensed forms small drops of water and globules of oil which remain in the desiccant as the fluid under pressure leaves the filter cartridge 25 and flows through the chamber 29, past check valve 8 and thence to the purge reservoir 7 via passageway 30 and bore 33.

The pressure in the purge reservoir 7 will increase as air under pressure flows thereto from the filter cartridge 25. Therefore, as the pressure in the purge reservoir 7 increases, air under pressure will flow from this reservoir 7 through the filter element 35, bore 38, chamber 34, past check valve 9 to chamber 43 and thence to the main storage reservoir 2 via pipe 49.

It will be noted that air under pressure from the chamber 34 flows to the supply port 52 of the supply valve device 6 via pipe 54 and from the chamber 43 to the governor device 5 via pipe 47.

From the above, it is apparent that the compressor 1 will supply air under pressure to the storage reservoir 2 to increase the pressure therein.

When the pressure in the storage reservoir 2 and the pipe 47 has been increased to the hereinbefore-mentioned chosen high pressure, the governor device 5 will operate in response to this pressure in the manner explained in hereinbefore-mentioned U.S. Pat. No. 1,615,365 to supply air under pressure from the storage reservoir 2, pipes 49 and 47 and chamber 43 to the pipe 48 from whence it will flow via the pipe 50 to the switch device 46 whereupon the contacts of this switch device are open thereby cutting off the supply of electric current to the motor that drives the compressor 1 thereby stopping this compressor.

Since the pipe 48 is connected to the control port 51 of the supply valve device 6, when the pressure in a chamber 78 below a diaphragm 79 is increased sufficiently to overcome the biasing force of a spring 80 on a diaphragm type of valve 81, the diaphragm of which is provided with a pair of apertures 82 therein, and the fluid pressure force due to fluid under pressure acting over that portion of this diaphragm within an annular valve seat 83. The valve 81 will be unseated from this valve seat 83.

Upon the unseating of valve 81 from its seat 83, fluid under pressure will be supplied from the purge reservoir 7 to the chamber 74 of the combined compressor unloading and backflow vent valve device 11 via filter element 35, bore 38, chamber 34, pipe 54, supply port 52, apertures 82, thence via a counterbore 84 coaxial with a bore 85 at the upper end of which counterbore 84 is formed valve seat 83, a passageway 86 opening at one end into the counterbore 84 and at the other to the delivery port 53, this delivery port 53, and the pipe 55.

When the pressure of fluid thus supplied to chamber 74 of the valve device 11 becomes sufficient to overcome the opposing force of spring 76, diaphragm 70 will deflect in the direction of the right hand, as viewed in the drawing, to shift stem 66 in this same direction and thereby cause unseating of ball-type valve 64 from its seat 65, it being noted that this valve 64 is normally maintained against the seat 65 by fluid under pressure in the pipe 18.

When valve 64 is thus unseated from its seat 65, the pipe 13 connected to the discharge valve chamber of the high pressure cylinder 16 of compressor 1 is connected to atmosphere via aftercooler 3, pipe 12, chamber 17 in filter unit 4, pipe 18, past now open valve 64, bore 59 and passageway 77. Consequently, the pressure in the pipes 13 and 12 is reduced as fluid under pressure flows therefrom to atmosphere thus unloading the compressor 1.

Moreover, when valve 64 is unseated from its seat 65, the air under pressure now trapped in the purge reservoir 7 by the check valve 9 will flow back through the bore 33, passageway 30 and choke 10 in check valve 8, to the chamber 29 at the top of the filter cartridge 25 and thence successively through the desiccant in this cartridge 25, chamber 17, pipe 18 and past now open valve 64 to atmosphere via bore 59 and passageway 77 at a rate controlled by the size of the choke 10.

Since the chamber 74 in the valve device 11 is connected to the purge reservoir 7 via passageway 75, pipe 55, now open valve 81 of supply valve device 6, pipe 54, chamber 34, bore 38 and filter element 35, the pressure in this chamber 74 will be reduced simultaneously as the pressure in the purge reservoir 7 is reduced. Consequently, the fluid under pressure in the chamber 74 and the purge reservoir 7 will thus flow to atmosphere until the pressure in the chamber 74 is reduced to such a value that the spring 76 is rendered effective to return the diaphragm 70, diaphragm follower 68 and valve operating stem 66 to the position shown. The fluid under pressure remaining in the pipe 18 will now seat valve 64 on its seat 65 to prevent further flow of fluid under pressure from chamber 74 and the purge reservoir 7 to atmosphere. It should be noted at this point that the time required for the pressure in the purge reservoir 7 to be reduced to the value at which valve 64 is reseated on its seat 65 is dependent upon or is a function of the volumetric capacity of the purge reservoir 7 and the strength of the spring 76.

The effect of this reverse flow of air under pressure from the purge reservoir 7 through the desiccant in the cartridge 25 is to dislodge the condensation in the form of small drops of water and globules of oil from the surface of the activated alumina fines or other desiccant in this cartridge so that this condensation becomes entrained in the fluid pressure stream and passes therewith to the atmosphere.

At the time the combined compressor unloading and backflow vent valve device 11 is operated to open its valve 64, the pressure in the chamber 74, purge reservoir 7 and filter unit 4 are substantially the same. After the valve 64 is opened, the pressure in chamber 74, purge reservoir 7 and filter unit 4 will be reduced at substantially the same rate until the pressure in each reaches a value determined by the strength of spring 76, it being understood that the strength of this spring 76 is so selected that this pressure may be any desired low value. As the pressure within the cartridge 25 in the filter unit 4 is thus reduced, the pressure on the small drops of water and globules of oil within the submicroscopic capillary fines of the activated alumina or other desiccant material is also reduced.

This reduction in pressure causes an evaporation of some of the droplets of water from the submicroscropic interior surfaces of the activated alumina fines or other desiccant so that the water vapor resulting from this evaporation becomes entrained in the dry fluid under pressure (air) flowing from the purge reservoir 7 through these fines and is carried therewith to atmosphere via the open valve 64 of valve device 11.

The removal of the condensate in the form of water and oil from the desiccant in the manner explained above effects a reactivation of the desiccant whereby upon subsequent operation of the compressor 1 loaded, the desiccant in cartridge 25 will be more effective to remove oil vapor and water vapor from fluid under pressure passing through this cartridge to the storage reservoir 2 than at the time the compressor 1 was stopped.

It should be noted that by effecting reclosing of the valve 64 in the valve device 11 upon the pressure in the chamber 74 and the purge reservoir 7 reaching a chosen low value dependent on the strength of the spring 76, the time that the valve 64 remains open is comparatively short and is less than the time that would be required in winter weather for the flocculent mass resulting from the condensing by flocculation of the entrained moisture in the air flowing to atmosphere via this open valve 64 to freeze into ice so that this valve 64 could not properly be reseated on its seat 65.

After the pressure in the purge reservoir 7 has been reduced by flow to atmosphere to the value at which the valve 64 of the valve device 11 is reseated on its seat 65 by the remaining fluid under pressure in pipe 18, this valve 64 will remain closed and the compressor 1 stopped until the use of fluid under pressure from the storage reservoir 2 reduces the pressure therein to a second chosen pressure which is lower than the hereinbefore-mentioned chosen high pressure. Upon the pressure in the storage reservoir 2 being reduced to this second chosen pressure, the governor device 5 will operate in response thereto to establish a communication between the pipes 48 and 50 and atmosphere whereupon fluid under pressure will be released from the control port 51 of the supply valve device 6 and from the switch device 46.

Upon release of fluid under pressure from the control port 51 of the valve device 6, the elements of this valve device will return to the position in which they are shown whereupon all fluid under pressure in the chamber 74 is vented to atmosphere via passageway 75, pipe 55, delivery port 53, passageway 86, counterbore 84, bore 85 and an exhaust passageway 87.

Upon the release of fluid under pressure from the pipe 50, the switch device 46 will operate to effect closing of its contacts in the manner explained in hereinbefore-mentioned U.S. Pat. No. 3,448,229, whereupon electric power will be supplied to the motor that drives the compressor 1. This motor will now drive the compressor 1 to effect the supply of fluid under pressure to the storage reservoir 2 until the pressure therein again reaches the hereinbefore-mentioned high pressure. When the pressure in the storage reservoir 2 reaches the hereinbefore-mentioned high pressure, the governor device 5 will operate in response to this pressure to again supply fluid under pressure from the storage reservoir 2 to the pipes 48 and 50 whereupon the compressor 1 will be stopped and the substantially dry air in the purge reservoir 7 again will be vented to atmosphere through the filter cartridge 25 to reactivate the desiccant therein in the manner hereinbefore explained until the pressure in the purge reservoir 7 reaches a low value dependent upon the strength of spring 76 in valve device 11.

By venting the purge reservoir 7 to atmosphere through the desiccant in the filter cartridge 25 each time the compressor 1 is stopped, the desiccant is reactivated so that its useful life extends over a period of time substantially much longer than would be the case if no reactivation were made during the time the compressor 1 is stopped.

Moreover, limiting the time that the valve 64 of the combined compressor unloading and backflow vent valve device 11 is held open in accordance with the strength of the spring 76 and independently of the rate of use of fluid under pressure from the storage reservoir 2 prevents freezing in winter weather of any flocculent mass that might collect in or on this valve device 11.

It will be understood that while the invention has been described with respect to compressed air systems of the start-stop or continuous operation load-unload type, the apparatus is equally effective in connection with other types of compressible fluids or gases. Reference is, therefore, made in the appended claims to fluids or gases generally without limitation to compressed air.

Having now described the invention what we claim as new and desire to secure by Letters Patent, is:

1. Cleansing apparatus for a filter unit of the desiccant type disposed in a conduit connecting a fluid compressor to a storage reservoir, said cleansing apparatus comprising:
    a. a purge reservoir charged with fluid under pressure delivered by the fluid compressor, wherein the improvement comprises:
    b. a fluid pressure operated combined compressor unloading and backflow vent valve device operable by fluid under pressure from said purge reservoir to concurrently effect a release of fluid under pressure from the conduit and a supply of fluid under pressure from said purge reservoir through the filter unit to atmosphere in a direction opposite to the normal direction of flow of fluid under pressure therethrough to remove contaminants from and thus reactivate the desiccant in said filter unit until the pressure in the purge reservoir is reduced to a chosen low pressure, and
    c. fluid pressure operated means effective upon the pressure in the storage reservoir reaching a chosen value to cause the flow of fluid under pressure from said purge reservoir to said fluid pressure operated combined compressor unloading and backflow vent valve device to effect operation thereof.

2. Cleansing apparatus for a filter unit, as recited in claim 1, further characterized by one-way flow valve means providing flow of fluid under pressure from said purge reservoir to the storage reservoir, and by means for limiting the rate of flow from said purge reservoir in the direction of the filter unit.

3. Cleansing apparatus for a filter unit, as recited in claim 1, further comprising:
    a. a first one-way flow valve means providing flow of fluid under pressure from the filter unit to said purge reservoir,
    b. means carried by said first one-way flow valve means for limiting the rate of flow from said purge reservoir in the direction of the filter unit, and
    c. a second one-way flow valve means providing flow of fluid under pressure from said purge reservoir to said storage reservoir and to said fluid pressure operated means.

4. Cleansing apparatus for a filter unit, as recited in claim 1, further characterized in that said purge reservoir is disposed between the filter unit and the storage reservoir on the downstream side of the filter unit.

5. Cleansing apparatus for a filter unit, as recited in claim 2, further characterized by a filter element interposed between said purge reservoir and said one-way flow valve means for removing contaminants from fluid under pressure flowing from said purge reservoir to the storage reservoir.

6. Cleansing apparatus for a filter unit, as recited in claim 2, further characterized in that said fluid pressure operated means comprises:
    a. a fluid pressure operated valve device for effecting the supply of fluid under pressure from said purge reservoir to said combined compressor unloading and backflow vent valve device to cause operation thereof, and
    b. a compressor governor device operable in response to the pressure in the storage reservoir reaching a chosen high pressure to effect the supply of fluid under pressure from the storage reservoir to said fluid pressure operated valve device, and in response to a subsequent reduction of the pressure in the storage reservoir to a chosen lower pressure to effect cut off of said supply of fluid under pressure to said fluid pressure operated valve device and release of fluid under pressure therefrom to atmosphere, c. said fluid pressure operated valve device being connected to the inlet side of said one-way flow valve means and said compressor governor device being connected to the outlet side of said one-way flow valve means.

7. Cleansing apparatus for a filter unit, as recited in claim 6, further characterized in that said fluid pressure operated combined compressor unloading and backflow vent valve device comprises:

a. a valve to control communication between both the interior of the filter unit and the interior of that portion of the conduit connecting the compressor to the filter unit and atmosphere, b. biasing means, c. a movable abutment for effecting operation of said valve to open and close said communication, said abutment being subject on one side thereof to fluid under pressure supplied thereto from said purge reservoir upon operation of said fluid pressure operated valve device and on the opposite side to said biasing means whereby said abutment is effective upon the supply of fluid under pressure from said purge reservoir to said one side to maintain said communication open to release fluid under pressure from said purge reservoir to atmosphere until the force of said biasing means on said opposite side of said abutment exceeds the fluid pressure force of the fluid under pressure from said purge reservoir effective on said one side whereby said movable abutment is rendered effective to provide for the closing of said communication by said valve upon the reduction of the pressure in said purge reservoir to a chosen low value thereby enabling operation of said valve to close said communication independently of subsequent operation of said compressor governor device to release fluid under pressure from said fluid pressure operated valve device thus precluding freezing of any flocculent mass on said valve upon the flow therepast of fluid under pressure from said purge reservoir subsequent to entraining moisture therein by flow through the desiccant in the filter unit to effect reactivation of the desiccant by the removal of said moisture therefrom.

8. For use in a compressed fluid installation of the type including a storage reservoir, a fluid compressor, a conduit through which the compressor effects the supply of fluid under pressure to the reservoir for the charging thereof, fluid pressure operated means for releasing fluid under pressure from a portion of the conduit connected to the discharge of the compressor to atmosphere, and fluid pressure operated valve means operated in consequence of the pressure in the storage reservoir reaching a chosen value for effecting operation of the fluid pressure operated releasing means, wherein the improvement comprises a combined filter unit of the desiccant type and reactivating means therefor, said combined filter unit and reactivating means therefor comprising:

a. a sectionalized casing having a plurality of casing sections each provided with at least one cavity whereby said casing sections cooperate to provide said sectionalized casing with a plurality of chambers, one of said casing sections having formed integral therewith a support arm extending into one of said chambers into which opens said portion of said conduit connected to the discharge of the compressor, b. a filter cartridge filled with a desiccant, said cartridge being disposed between said one chamber and another of said chambers and interposed between and in sealing relation with said support arm and a second one of said casing sections, c. a first one-way flow valve means controlling flow of filtered fluid under pressure from said another chamber to a third chamber of said plurality of chambers, d. choke means for providing a limited rate of flow of fluid under pressure from said third chamber to said another chamber, e. a filter element disposed between said third chamber and a fourth chamber from which fluid under pressure may be supplied for effecting operation of the fluid pressure operated releasing means, and f. a second one-way flow valve means controlling flow of filtered fluid under pressure from said fourth chamber to a fifth chamber from which fluid under pressure may be supplied to the storage reservoir g. said fluid pressure operated releasing means being so constructed as to cooperate with said choke means and said one-way flow valve means as to provide for operation of said releasing means by fluid under pressure supplied thereto from said fourth chamber to release fluid under pressure from said third chamber to atmosphere via said filter cartridge to effect reactivation of the desiccant therein until the pressure in said third and fourth chambers is reduced to a chosen low value.

9. A combined filter unit and reactivating means as recited in claim 8, further characterized in that said first one-way flow valve means comprises:

a. an annular valve seat carried by said second casing section, and b. a valve for cooperation with said valve seat.

10. A combined filter unit and reactivating means, as recited in claim 8, further characterized in that said second one-way flow valve means comprises:

a. an annular valve seat carried by said one casing section, and b. a valve for cooperation with said valve seat.

11. A combined filter unit and reactivating means, as recited in claim 8, further characterized in that said one chamber is formed by the cooperative relationship between said one and said second casing sections, and said another chamber is formed by the cooperative relationship of the interior of said filter cartridge and said second casing section.

12. A combined filter element and reactivating means, as recited in claim 8, further characterized in that said third chamber is formed by the cooperative relationship between said one and said second casing sections, and by means carried by said one casing section separating said one chamber and said third chamber.

13. A combined filter element and reactivating means, as recited in claim 8, further characterized in that said fourth and fifth chambers are formed in said one casing section, and by an opening therein through which said filter element disposed between said third and fourth chambers may be removed.

14. A combined filter element and reactivating means, as recited in claim 8, further characterized in that said one casing section has formed integral therewith a second support arm for supporting thereon said filter element, said second support arm being so disposed that, when supporting thereon said filter element, said filter element is disposed between and separates said third and fourth chambers.

15. A combined filter element and reactivating means, as recited in claim 9, further characterized in that said second casing section is provided with an opening therein through which said valve may be removed, and by removable means for closing said opening.

16. A combined filter element and reactivating means, as recited in claim 10, further characterized in that said one casing section is provided with an opening through which said valve may be removed, and by removable means for closing said opening.

* * * * *